United States Patent
Kapoor et al.

(10) Patent No.: US 7,712,061 B2
(45) Date of Patent: *May 4, 2010

(54) METHOD, SYSTEM, AND COMPUTER PROGRAM PRODUCT FOR GENERATING AND VERIFYING ISOLATION LOGIC MODULES IN DESIGN OF INTEGRATED CIRCUITS

(75) Inventors: Bhanu Kapoor, Richardson, TX (US); Debabrata Bagchi, Noida (IN); Sanjay Churiwala, Noida (IN)

(73) Assignee: ATRENTA, Inc., San Jose, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 11/959,427

(22) Filed: Dec. 18, 2007

(65) Prior Publication Data

US 2008/0098338 A1 Apr. 24, 2008

Related U.S. Application Data

(63) Continuation of application No. 10/711,493, filed on Sep. 21, 2004, now Pat. No. 7,349,835.

(51) Int. Cl.
*G06F 17/50* (2006.01)

(52) U.S. Cl. .............................. 716/5; 703/14
(58) Field of Classification Search ....................... 716/5
See application file for complete search history.

(56) References Cited

U.S. PATENT DOCUMENTS

| | | | |
|---|---|---|---|
| 5,483,176 A | 1/1996 | Rodriquez et al. | |
| 6,083,271 A | 7/2000 | Morgan | |
| 6,600,358 B1 | 7/2003 | Chan | |
| 6,711,719 B2 | 3/2004 | Cohn et al. | |
| 6,717,452 B2 | 4/2004 | Carpenter et al. | |
| 7,152,216 B2 | 12/2006 | Kapoor et al. | |
| 2007/0245278 A1* | 10/2007 | Chen | 716/5 |
| 2007/0245285 A1* | 10/2007 | Wang et al. | 716/10 |
| 2008/0127015 A1* | 5/2008 | Chandramouli et al. | 716/5 |

OTHER PUBLICATIONS

Munch et al., Automating RT-Level Operand Isolation to Minimize Power Consumption in Datapaths, Proceedings of the conference on Design, automation and test in Europe Date '00, Jan. 2000, pp. 624-631.

Zarrineh et al., System-on-Chip testability Using LSSD Scan Structures, IEEE Design & Test of Computers, vol. 18, May-Jun. 2001, pp. 83-97.

(Continued)

*Primary Examiner*—Jack Chiang
*Assistant Examiner*—Brandon W Bowers
(74) *Attorney, Agent, or Firm*—Sughrue Mion, PLLC

(57) ABSTRACT

A method, system and computer program product for generating and verifying the correctness of isolation logic modules in design of integrated circuits (ICs). The method disclosed generates an isolation logic module for each power domain specified by a user, instantiates the generated module in a pre-determined wakeup domain, and then simulates shutdown conditions to ensure the correctness of the generated isolation logic module. The isolation logic is generated based on user-defined voltage constraints.

44 Claims, 8 Drawing Sheets

OTHER PUBLICATIONS

Mamidipaka et al., IDAP: A Tool for High-Level Power Estimation of Custom Array Structures, IEEE Transactions on Computer-Aided Design of Integrated Circuits and Systems, vol. 23, No. 9, Sep. 2004, pp. 1361-1369.

Park et al., Embedded DRAM (eDRAM) Power-Energy Estimation for System-on-a-Chip (SoC) Applications, $7^{th}$ Asis and South Pacific International Conference on VLSI Design, Jan. 2002, pp. 625-630.

* cited by examiner

Memory Controller (mc_top) for SPWD1

```
4000   module
       iso_logic_block_for_SPDW1_1(out_wb_data_o,out_wb_ack_o,out_wb_err_o,out_wb_
       read_go,out_wb_write_go,out_wb_first,out_wb_wait,out_wr_hold,wb_data_o,wb_ack_
       o,wb_err_o,wb_read_go,wb_write_go,wb_first,wb_wait,wr_hold,iso_signal_blocking);

4010   input [31:0] wb_data_o ;
4020   input wb_ack_o ;
4030   input wb_err_o ;
4040   input wb_read_go ;
4050   input wb_write_go ;
4060   input wb_first ;
4080   input wb_wait ;
4090   input wr_hold ;
4100   input iso_signal_blocking ;

4110   output [31:0] out_wb_data_o ;
4120   output out_wb_ack_o ;
4130   output out_wb_err_o ;
4140   output out_wb_read_go ;
4150   output out_wb_write_go ;
4160   output out_wb_first ;
4170   output out_wb_wait ;
4170   output out_wr_hold ;

4180   wire iso_signal_blocking_n;

4190   assign iso_signal_blocking_n = ~iso_signal_blocking;
4200   assign out_wr_hold = iso_signal_blocking_n & wr_hold;
4210   assign out_wb_wait = iso_signal_blocking | wb_wait;
4220   assign out_wb_first = iso_signal_blocking | wb_first;
4230   assign out_wb_write_go = iso_signal_blocking_n & wb_write_go;
4240   assign out_wb_read_go = iso_signal_blocking_n & wb_read_go;
4250   assign out_wb_err_o = iso_signal_blocking_n & wb_err_o;
4260   assign out_wb_ack_o = iso_signal_blocking | wb_ack_o;
4270   assign out_wb_data_o[31] = iso_signal_blocking_n & wb_data_o[31];
4280   assign out_wb_data_o[30] = iso_signal_blocking_n & wb_data_o[30];
       .
       .
       .
4560   assign out_wb_data_o[2] = iso_signal_blocking_n & wb_data_o[2];
4570   assign out_wb_data_o[1] = iso_signal_blocking_n & wb_data_o[1];
4580   assign out_wb_data_o[0] = iso_signal_blocking_n & wb_data_o[0];

4590   endmodule
```

FIGURE 4B

METHOD, SYSTEM, AND COMPUTER PROGRAM PRODUCT FOR GENERATING AND VERIFYING ISOLATION LOGIC MODULES IN DESIGN OF INTEGRATED CIRCUITS

CROSS REFERENCE TO RELATED APPLICATIONS

This application is a continuation of a U.S. patent application Ser. No. 10/711,493, which has a common assignee with the present invention and is hereby incorporated by reference in its entirety.

BACKGROUND OF THE INVENTION

1. Field of the Invention

The present invention relates generally to the design of integrated circuits (ICs) and more particularly to methods for generating and verifying isolation logic in the design of ICs.

2. Description of the Related Art

Complex electronic systems are typically designed using integrated circuits (ICs) comprising multiple functional blocks. An IC may have a wide range of power supply conditions, a number of independent power domains, and circuit performance objectives. Generally, different power domains are established between digital, analog and radio frequency (RF) functional blocks on an IC. As an example, a wireless handset chip has several power domains due to multiple modes of operation.

Referring to FIG. 1, an exemplary circuit 100 including two power domains 110 and 120 is shown. The power domains 110 and 120 are logic units serving different functions. Power domains 110 and 120 are powered by signals $VC_1$ and $VC_2$ supplied by a level shifter 130, which translates power signals between two voltage domains. For example, level shifter 130 may translate signals originating from a first domain operating under a lower supply voltage (e.g., 1.2V) to a second domain operating with a higher supply voltage (e.g., 2.5V). However, it should be noted that power domains do not have to be connected to a level shifter.

For power management purposes and reducing power consumption, parts of a design are usually turned off during the operation of a semiconductor device. Specifically, power domains that power IC areas not actively used in certain modes of operation are completely shut down. A correct design requires that when a power domain is shut down, its output signals will not become indeterminable so that an unknown state is transferred to the rest of the design.

Moreover, leakage power is a critical concern for design of ICs that operate in stand-by mode and are manufactured using advanced fabrication technologies, such as 90 nm and below. Turning off a supply to the regions of design in such modes of operation eliminates leakage power consumption associated with these regions completely. For isolating and enforcing stable output values at shutdown, the outputs of power domains 110 and 120 are connected to isolation logic modules 140 and 150 respectively. Isolation logic modules 140 and 150 ensure that power domains 110 and 120 are correctly isolated and none of their outputs is left indeterminable, and are therefore determinable, when the power is off. The design of isolation logic demands a designer to determine a set of shutdown constraints including steady state output values, shutdown conditions, wakeup/shutdown signals, and so on.

Prior art design tools, e.g., computer aided design (CAD) do not provide automated means for isolating power domain in the design, i.e., generating and inserting isolation logic modules in the design. Moreover, such tools generally require that the user identify all power domains in the design, define an isolation logic for each domain and check its correctness. In ICs where the number of power domains may be large, this is an inefficient, time-consuming, as well as an error prone task.

It would be, therefore, advantageous to provide a solution that automatically generates isolation logic modules for power domains and appropriately places these modules in the design. It would be further advantageous if the provided solution automatically detects isolation logic modules within the design and checks their correctness.

SUMMARY OF THE INVENTION

The present invention addresses the aforementioned problems. An aspect of the invention is to provide a method for generating and verifying isolation logic modules in a design of an integrated circuit (IC), the method comprising specifying a plurality of voltage constraints defining at least one power domain in the design, iteratively checking, for each of the power domain, if an isolation logic module isolating the power domain exists in the design, verifying the correctness of the isolation logic module existing in the design, if the isolation logic module is identified, generating an isolation logic module for isolating the power domain, if the power domain is not correctly isolated, and inserting the generated isolation logic in the design.

Consistent with an aspect of the present invention, there is provided a computer program product, comprising a computer-readable medium with instructions to enable a computer to implement a method for generating and verifying isolation logic modules in a design of an integrated circuit (IC), the method comprising specifying a plurality of voltage constraints defining at least one power domain in the design, iteratively checking for each of the power domain if an isolation logic module isolating the power domain exists in the design, verifying the correctness of the isolation logic module existing in the design, if the isolation logic module is identified, generating an isolation logic module for isolating the power domain, if the power domain is not correctly isolated, and inserting the generated isolation logic in the design.

Consistent with another aspect of the invention, there is provided a method for generating isolation logic modules in a design of an integrated circuit (IC), the method comprising specifying a plurality of voltage constraints defining at least one power domain in the design, iteratively producing, for each of the power domain using the voltage constraints, a description language code implementing the isolation logic module, instantiating the description language code to form an instance of the isolation logic module, inserting the instance of the isolation logic module in a wakeup domain, renaming output names of the power domain, and assigning the original names of the power domain's output names to outputs of the isolation logic module.

In another aspect, there is provided a computer program product, including a computer-readable medium with instructions to enable a computer to implement a method for generating isolation logic modules in a design of an integrated circuit (IC), the method comprising specifying a plurality of voltage constraints defining at least one power domain in the design, iteratively producing, for each of the power domain using the voltage constraints, a description language code implementing the isolation logic module, instantiating the description language code to form an instance of the isolation logic module, inserting the instance of the isolation logic module in a wakeup domain, renaming output names of the power domain, and assigning the original names of the power domain's output names to outputs of the isolation logic module.

Consistent with an aspect of the present invention, there is provided a method for verifying the correctness of isolation logic modules in a design of an integrated circuit (IC), the method comprising specifying a plurality of voltage constraints defining at least one power domain in the design, iteratively simulating shutdown conditions for each of the power domain, comparing each of the output values of the power domain to a respective steady state value, and generating an error report if the comparison results in an equality, checking if at least one isolation cell in the isolation module is not connected to a wakeup/shutdown signal, and generating the error report if the checking results in an affirmative answer, and checking if the wakeup/shutdown signal is generated in a wakeup domain, and generating the error report if the checking results in a negative answer; otherwise, generating a success report.

In another aspect of the invention, there is provided a computer program product, including a computer-readable medium with instructions to enable a computer to implement a method for verifying the correctness of isolation logic modules in a design of an integrated circuit (IC), and the method comprises specifying a plurality of voltage constraints defining at least one power domain in the design, iteratively simulating shutdown conditions, for each of the power domain, comparing each of the output values of the power domain to a respective steady state value, and generating an error report if the comparison results in an inequality, checking if at least one isolation cell in the isolation module is not connected to a wakeup/shutdown signal, and generating the error report if the checking results an affirmative answer, and checking if the wakeup/shutdown signal is generated in a wakeup domain, and generating the error report if the checking results in a negative answer; otherwise, generating a success report.

In another aspect, there is provided a computer system for generating and verifying isolation logic modules in the design of integrated circuit (IC), the system comprising a processor and a memory under control of the processor, a database operable to maintain voltage constraints specified by a user, a code generator operable to generate description language code of the isolation logic modules, an insertion unit operable to instantiate and insert in each of the isolation modules a respective wakeup domain, a checking unit operable to verify the correctness of the isolation logic modules, and a simulator for simulating shutdown conditions.

BRIEF DESCRIPTION OF THE DRAWINGS

FIGS. 4A-4D are non-limiting examples for generating and inserting isolation logic;

DETAILED DESCRIPTION OF THE INVENTION

An exemplary embodiment of the present invention generates an isolation logic module for each power domain specified by a user, instantiates the created module in a specified wakeup domain, and then simulates the shutdown conditions to ensure the correctness of a generated isolation logic module against the specified values. The isolation logic is generated based on user-defined voltage constraints.

Figure 1:
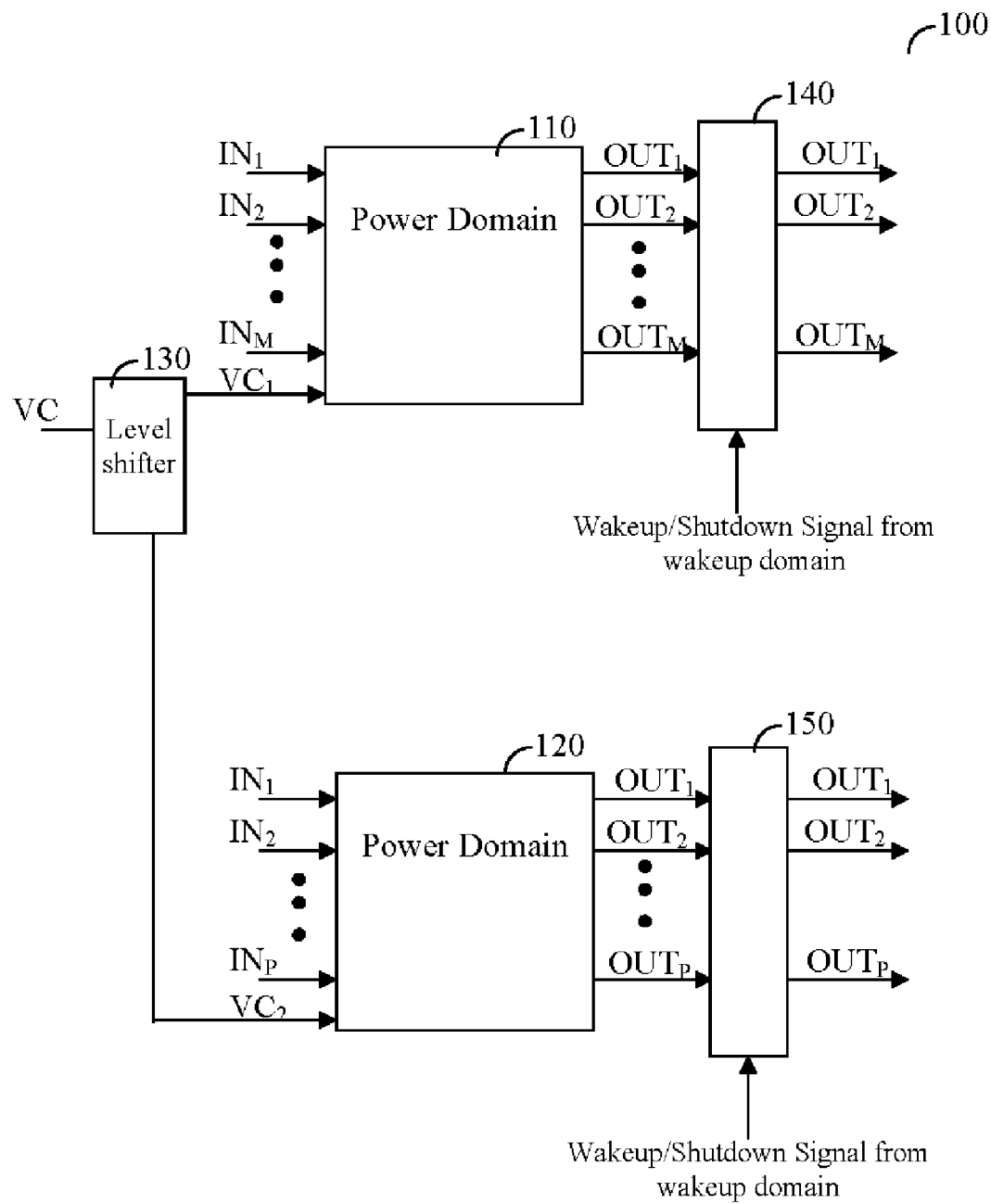
FIG. 1 is an exemplary circuit including two power domains (prior art)
Figure 2:
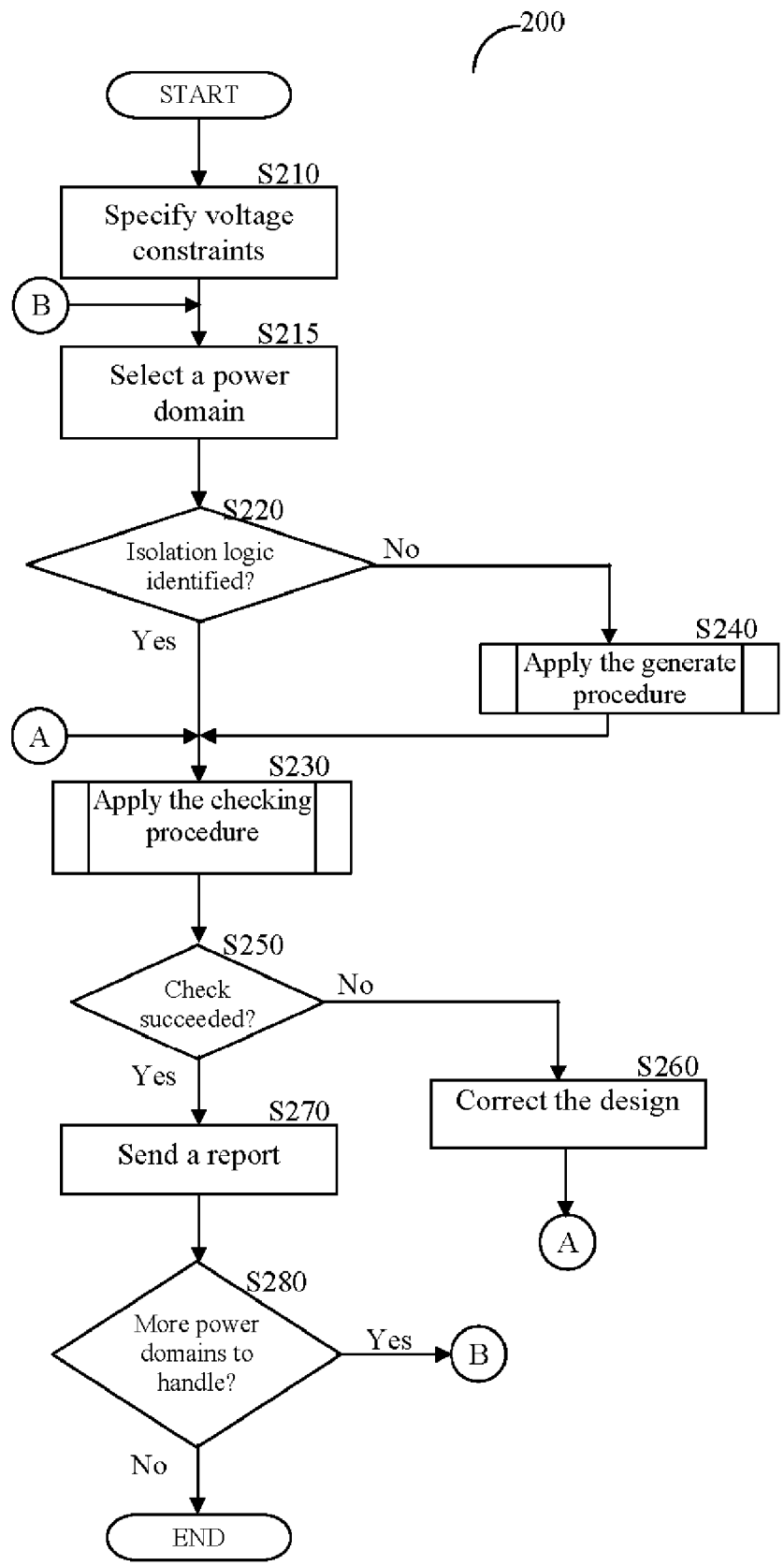
FIG. 2 is a non-limiting flowchart describing the operation of the present invention.

Referring to FIG. 2 a non-limiting flowchart 200 describing a method disclosed by the exemplary embodiment of the present invention is shown. For the purpose of verifying if power domains are correctly isolated, various constraints (hereinafter the "voltage constraints") are specified by a user (e.g., a design engineer) using, for example, a graphical user interface (GUI) at step S210. The voltage constraints include, but are not limited to, at least one power domain to be tested, its corresponding wakeup domain, a wakeup/shutdown signal and a list of steady state values. The wakeup/shutdown signal is generated in a wakeup domain and is enabled when the power domain is off. For example, the voltage constraints can be defined as follows:

voltagedomain–instname "top.wkup_domain_inst+"–name WPD–values 1.0     (1).

voltagedomain–instname "top.megamodule1+"–name SBPD1–values 1.0 0.0–isosigpden1–isoval 0     (2).

voltagedomain–instname "top.megamodule2+"–name SBPD2–values 1.2 0.0–isosigpden2–isoval 1     (3).

The constraint defined in (1) is a voltage-domain called "WPD", which is a wakeup domain of power domains SBPD1 and SBPD2 specified in constraints (2) and (3) above. The wakeup domain WPD is always on, as opposed to the domains SBPD1 and SBPD2 which are shut down during certain modes of operation. The 'isosig' argument determines the wakeup/shutdown signal and its corresponding values.

At step S215, a single power domain to be verified is selected. A different power domain is selected each time execution reaches this step to ensure that all power domains specified in the voltage constraints are tested. At step S220, it is determined whether an isolation logic isolating the selected power domain exists in the design, and if so execution continues with S230 where the correctness of this isolation logic is tested; otherwise, execution continues with step S240 where a procedure for generating and inserting an isolation logic is applied. Specifically, this procedure generates a description language code of a module defining the isolation logic for each power domain specified by the user and instantiates this module in the specified wakeup domain. The description language may be, but is not limited to, Verilog, VHDL (VHSIC Hardware Description Language), or a combination thereof. The procedure for generating a power domain is described in greater detail below.

Once the isolation logic is created, execution continues with step S230 for checking the correctness of the created logic. For the purpose of checking the isolation logic, shutdown conditions are simulated and the outputs of the power domains connected to the under-test isolation logic are examined. The isolation logic is considered correct if each of those outputs produce a well-determined value, i.e., either '1' or '0'. Likewise, the value prior to shut down can be retained through a retention cell. Step S230 is executed by a checking procedure described in further detail below.

At step S250, it is determined if the check succeeded, and if so at step S270 a success report including the check results is sent to the user; otherwise, execution continues with step S260 where an attempt is made to correct the isolation logic. Specifically, the register transfer level (RTL) statements are analyzed to resolve the error or errors in the design detected by the checking procedure. For example, if the check discovers that one of the isolation cells forming the isolation logic is not connected to a common enable signal, then the design is fixed by connecting that isolation cell to the common enable signal. The execution then continues with step S230. At step S280, another check is made to determine if all power domains specified in the voltage constraints were handled and if so, execution ends; otherwise, execution continues with step S215.

Figure 3:
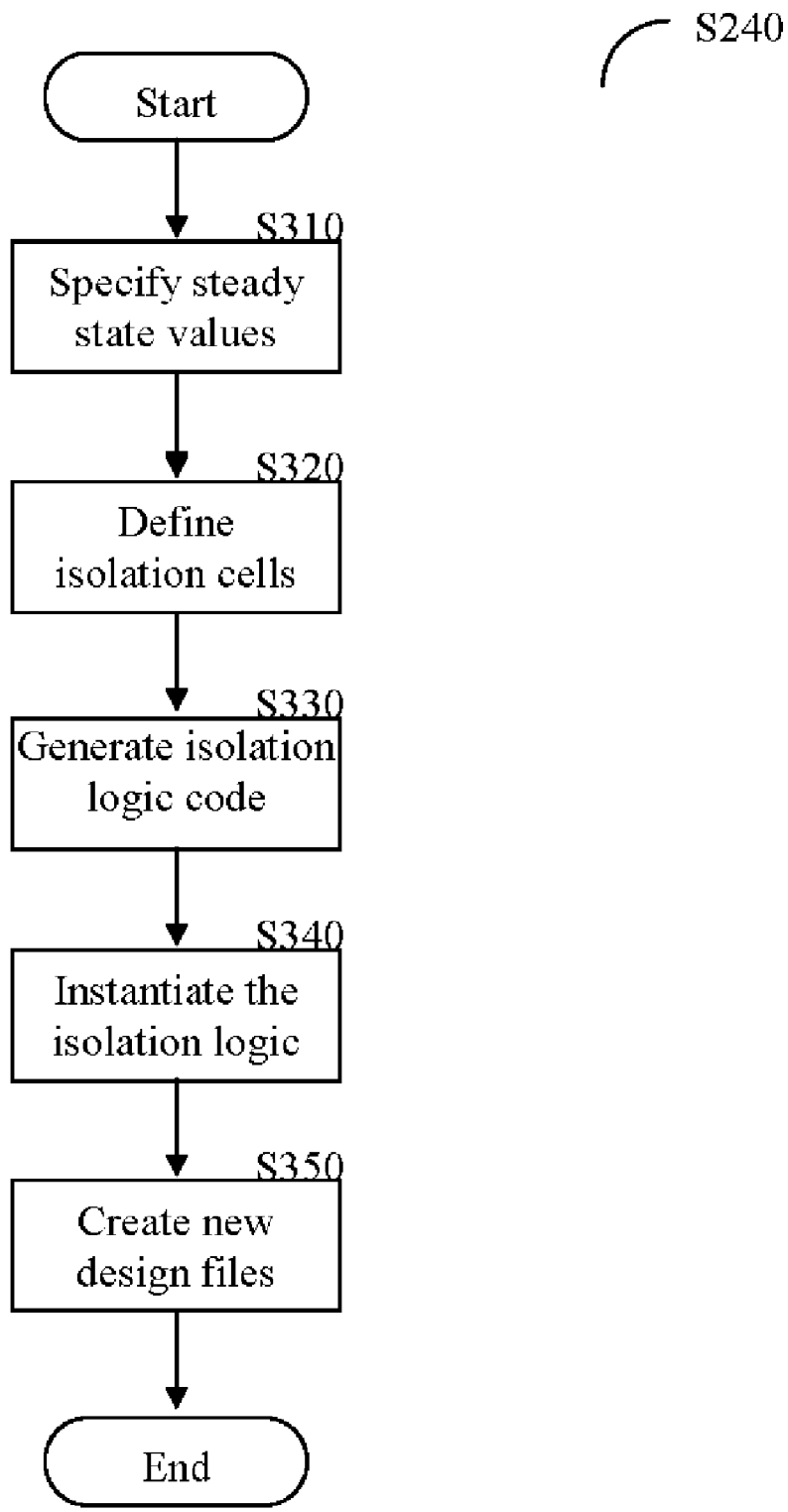
FIG. 3 is a non-limiting flowchart describing the procedure for generating and inserting isolation logic consistent with an exemplary embodiment of the present invention.

Referring to FIG. 3, a non-limiting flowchart S240 describing the procedure for generating and inserting isolation logic consistent with an exemplary embodiment of the present invention is shown. At step S310, the user specifies a steady state value for each output of the currently handled power domain. The output values are defined as pairs of <name, value>, i.e., the hierarchical name of an output signal is specified along with its steady state value. The steady state value may be either '0' or '1'. For a bus, either the value of each bit or the value of all bits can be specified. For example, a bus such as a DATA bus, where most of the bits hold the same steady state value, while some sparse bits differ, the user can choose to override the values of the sparse bits.

At step S320, the user may define the isolation cells that form the isolation logic. An isolation cell may be, but is not limited to an AND gate, an OR gate, a Latch, and the like. For isolation cells the user may define the enable signal for that cell and its value (i.e., "active high" or "active low"). In an exemplary embodiment, the steady state values and the isolation logic are part of the voltage constraints.

At step S330, based on the voltage constraints defined by the user, the isolation logic is generated. Specifically, a description language code module implementing the isolation logic for a selected power domain is produced. This code comprises instructions assuring that the power domain is correctly isolated. That is, under power off conditions the output values of the power domain are as the pre-determined steady state values. The code module further comprises instructions for determining the wakeup/shutdown signal that enables or disenables the isolation logic. An exemplary Verilog code module defining isolation logic is provided below.

At step S340, the module generated at step S330 is instantiated and inserted into a wakeup domain specified by the user. The method correctly instantiates the isolation logic modules in the wakeup domains using back referencing analysis and a synthesized netlist, which generally includes logical gates such as AND, NAND, NOR, OR, XOR, XNOR, latches, and the like. The back referencing analysis provides the precise location of the power domain instances in the design. The back referencing analysis connects a synthesized netlist object model with a data model of the netlist. For every definition and use of a signal in the netlist object model, a means of cross probing is established and the line and file name of every such definition is stored. The same operation is also performed for each definition and instantiation module. Thus, given a definition of use of a signal in the design file model, the precise location of this signal in the design file can immediately be established. Similarly, given an instantiation of a module in the synthesized object model, a corresponding location in the data model can be retrieved.

To restrict the locality of changes, the outputs names of the power domains are renamed and the original names are retained as outputs names of the isolation module. This ensures compatibility with signals feeding into other wakeup or "always on" domains. The synthesized netlist (or gate level netlist) may be produced by an IC synthesis tool. Synthesis tools produce a gate level netlist based on the RTL statements. One such synthesis tool is disclosed in a U.S. Pat. No. 6,993,733 entitled "An Apparatus and Method for Handling of Multi-Level Circuit Design Data", having a common assignee with the present invention and is hereby incorporated by reference.

At step S350 new design files including the new isolation logic are generated and displayed to the user. The design files may include a new RTL description and the synthesized netlist.

Figure 4A:
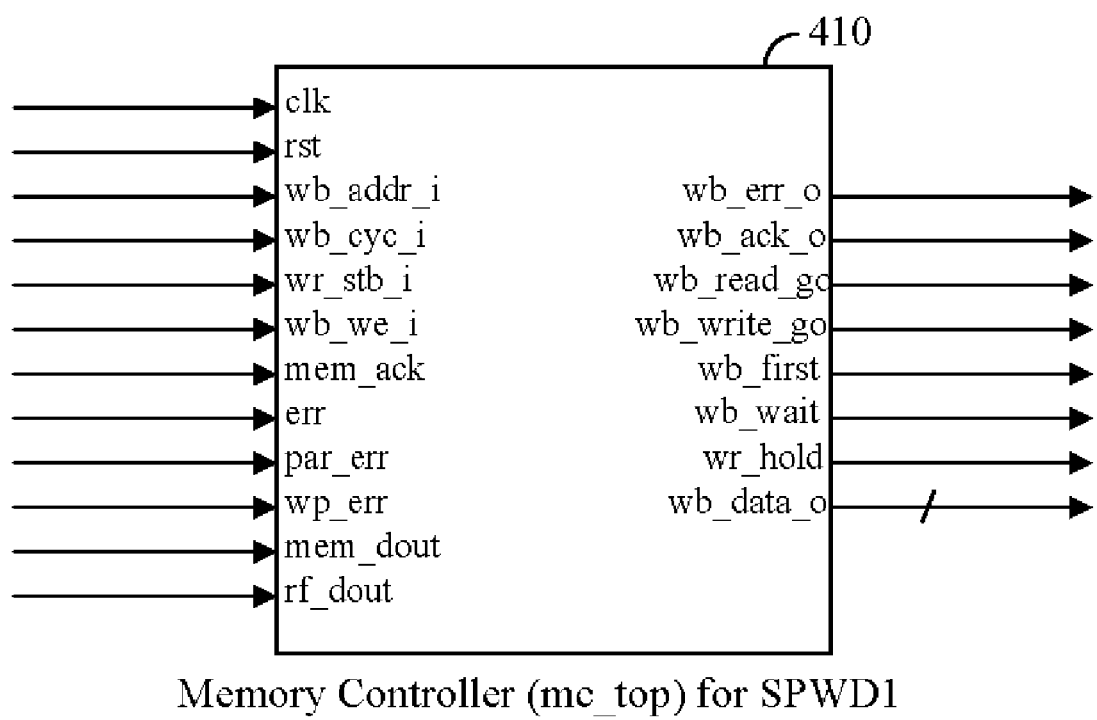

FIGS. 4A-4D show a non-limiting example for generating and inserting an isolation logic. In this example, isolation logic for a power domain named "SPWD1"<MBS: SPWD1 is just a name given to the module> that includes a memory controller "mc_top" 410 is generated. The specified wakeup/shutdown signal is "susp_req_i" and is enabled at a logic level '1'. The memory controller, as shown in FIG. 4A, includes the following outputs: wb_ack_o, wb_err o, wb_read_go, wb_write_go, wb_first, wb_wait, wr_hold, and wr_data_o. The steady state values, defined using the notation <name, value>, are as follows: <mc_top.wb_ack_o, 1>, <mc_top.wb_err_o, 0>, <mc_top.wb_read_go, 0>, <mc_top.wb_write_go, 0>, <mc_top.wb_first, 1>, <mc_top.wb_wait, 1>, <mc_top.wr_hold, 0>, and <mc_top.wb_data_o, 0>. The wr_data_o output is a data bus and the steady state value '0' is the same for all bits in the bus.

Once the steady state values are determined, the VHDL or Verilog code module for the isolation logic is created. An exemplary Verilog code of isolation logic generated module SPWD1 is provided in FIG. 4B. The input and output statements (shown in lines 4010 through 4170 of the exemplary code) represent connections to the isolation module. The input "iso_signal blocking" is the port name for wakeup/shutdown signal. When the value at this input equals '1' the isolation module is enabled.

The assignment statements (shown in lines 4190 through 4580) are programmed to ensure that the steady state values at shutdown are as defined by the user. An "assign" statement denotes a concurrent continuous assignment, which describes the functionality of the module. A concurrent assignment executes whenever one of the inputs changes value. For instance, the steady state value defined for the output "wb_wait" is '1'. The isolation logic sets (as shown in line 4210) the value of this output (expressed as "out_wb_wait" in the isolation module) to be equal to the outcome of the logical function: iso_signal blocking OR wb_wait. The value of the iso_signal_blocking at shutdown is always '1' and thus, at shutdown, the value of "out_wb_wait" is always equal to '1'. This can be easily seen in the timing diagram depicted in FIG. 4D.

Figure 4C:
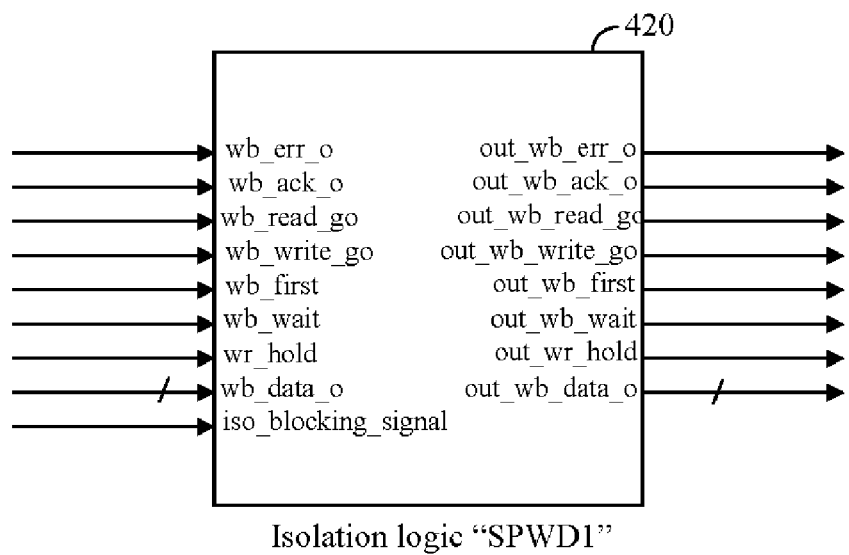
Figure 4D:
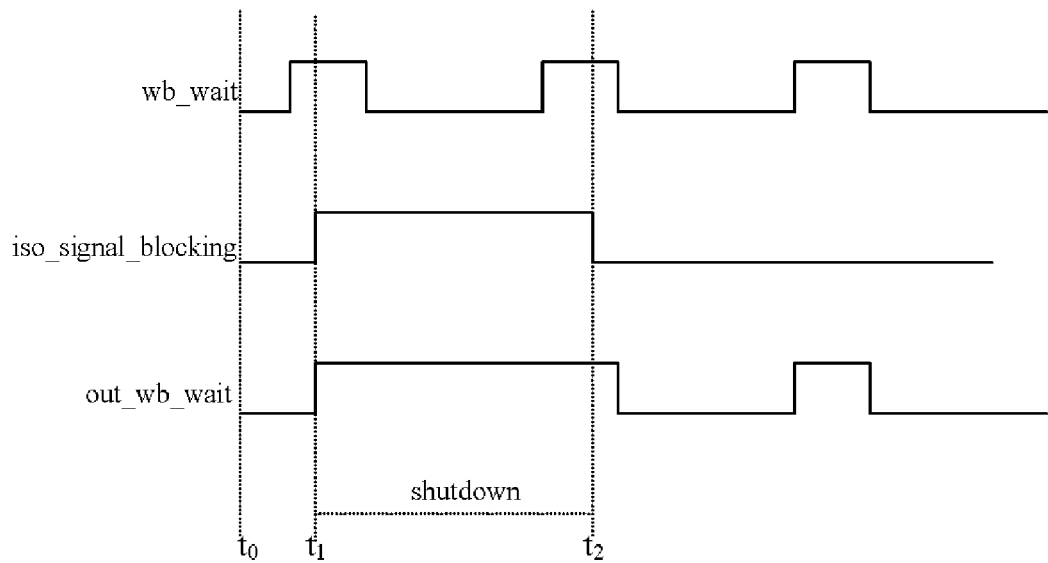

Thereafter, the Verilog isolation module is instantiated in the specified wakeup of the power domain. An instance of the generated isolation logic module "iso_logic for SPWD1" 420 is provided in FIG. 4C. As shown in FIG. 4C, the isolation logic instance 420 includes all the outputs and inputs defined in the Verilog code shown in FIG. 4B.

Figure 5:
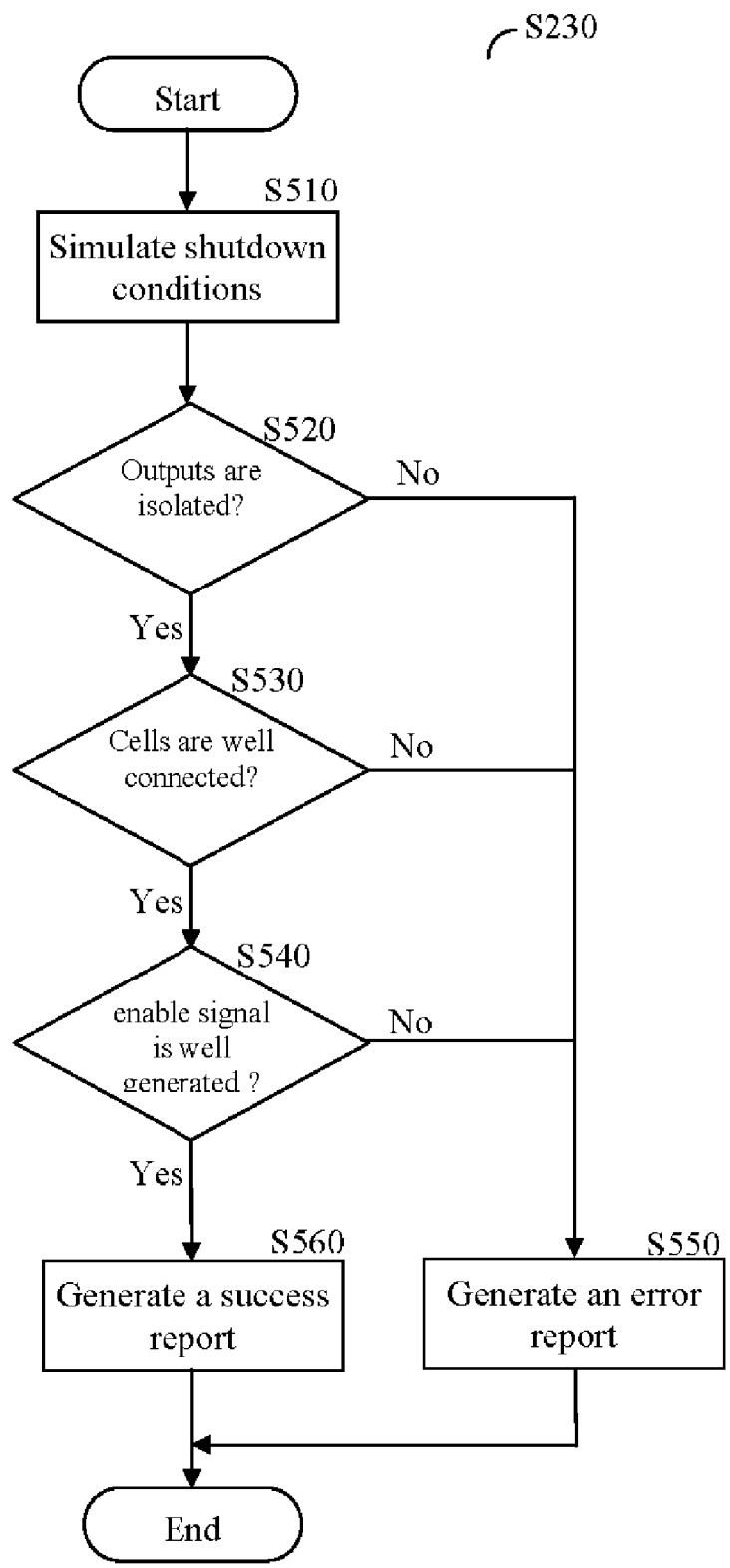
FIG. 5 is a non-limiting flowchart describing the procedure for checking isolation logic consistent with an exemplary embodiment of the present invention.

Referring to FIG. 5 a non-limiting flowchart S230 describing the checking procedure consistent with an exemplary embodiment of this invention is shown. This method can be used to verify the correctness of isolation logic rendered by the generating procedure or isolation logic that already exists in the design.

At step S510, the shutdown conditions are simulated, i.e., the power to the power domain connected to the isolation logic under test is shut off and the wakeup/shutdown signal is enabled.

At step S520, a check is made to determine if the outputs of the power domain are correctly isolated. Specifically, the value of each output under the shutdown conditions is compared with a respective steady state value specified by the user. When such values are not specified, it is checked that each output is not floated. If the check results in an error such as the quality of the compared values, at step S550 a report including the error type or the cause of the error is generated and sent to the user; otherwise, execution continues with step S530, where another check is made to determine if each isolation cell forming the isolation logic is connected to a common enabling signal, i.e., the wakeup/shutdown signal. For example, it is checked whether the "iso_signal blocking" is connected to each isolation cell forming the isolation logic "iso_logic_for SPWD1". If step S530 results in an error, at step S550 an error report including the error type is generated and sent to the user; otherwise, execution continues with step S540 where another check is performed in order to verify that the wakeup/shutdown is generated in a wakeup domain, and if so at step S560 a success report including the test result is generated and sent to the user; otherwise, execution continues with step S550. It should be noted that if one of the outputs of a power domain is connected to a different power domain, it is checked whether a level shifter is connected between the crossing identified power domains.

Consistent with an exemplary embodiment of the present invention the simulated shutdown conditions and the outputs tested during the execution of the checking procedure are highlighted in the design by means of a visualization tool. For example, a '0' value may be highlighted in orange, a '1' value in blue, and a floating output is highlighted in yellow. If a node is left floating, then the associated error code in VHDL or Verilog is also highlighted along with the highlighting of an associated schematic. This provides the user with an easy way to immediately recognize the floating outputs in the design, and thus save debugging time.

The methods disclosed can be further embodied by a person skilled in the art as part of a computer software program, a computer aided design (CAD) system, a CAD program, a netlist voltage domain analysis tool, and a RTL voltage domain analysis tool, and the like.

Figure 6:
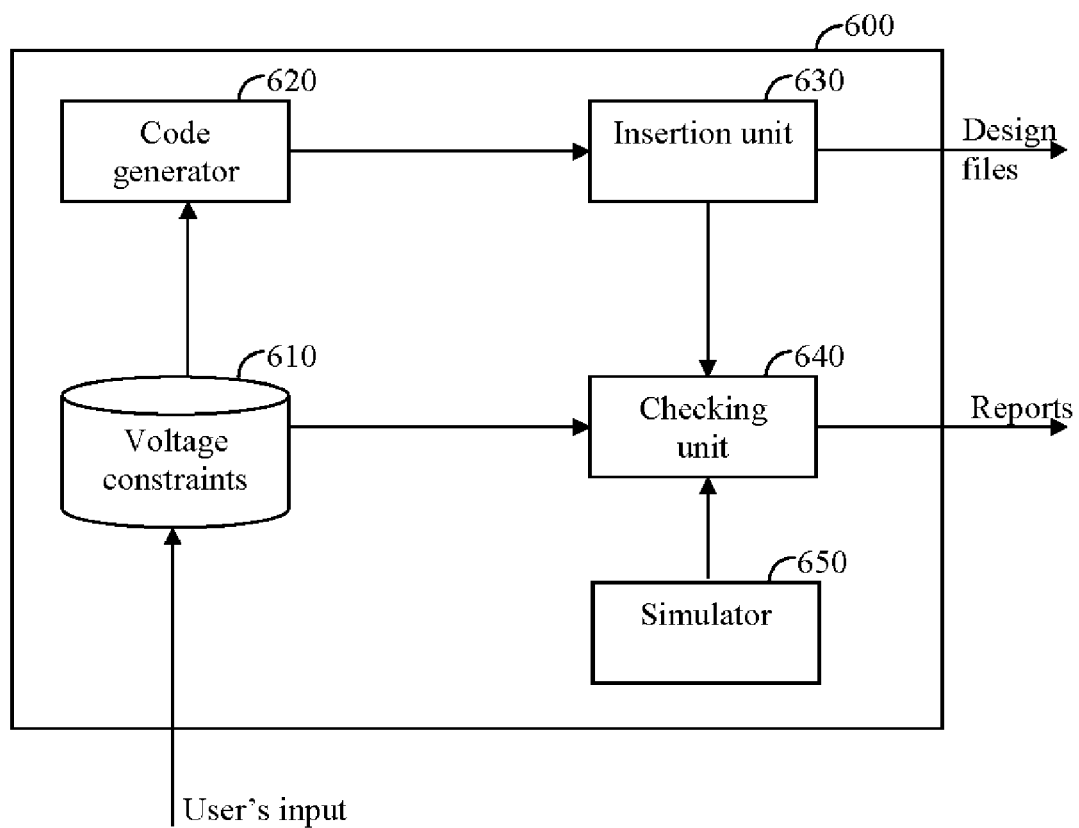
FIG. 6 is an exemplary implementation of a system for verifying power domains in the design of an integrated circuit (IC).

Referring to FIG. 6 an exemplary implementation of a system 600 for generating and verifying isolation logic modules in the design of integrated circuits (ICs) is shown. A database 610 maintains the voltage constraints specified by the user. A code generator 620 generates a description language code (e.g., VHDL, Verilog, or combination thereof) of isolation logic modules. An insertion unit 630 instantiates and inserts the isolation modules in the specified wakeup domains. The insertion unit 630 also outputs the updated design files. A checking unit 640 checks the correctness of the generated isolation logic and sends reports, including the check results, to the user. The isolation logic to be tested is received from insertion unit 630 while the shutdown conditions are simulated by a simulator 650.

The invention has now been explained with reference to exemplary embodiments. Other embodiments will be apparent to those of ordinary skill in the art in light of this disclosure. The scope of the invention should not be thought of as being limited by the exemplary embodiments; rather, the appended claims should be consulted.

What is claimed is:

1. A computer program product, enabling a computer system to perform a computer implemented method for generating and verifying isolation logic modules in a design of an integrated circuit (IC), the computer program product having computer instructions on a tangible computer readable medium, the computer instructions being adapted to enable the computer system, when executing the computer instructions, to perform operations, comprising:
   specifying a plurality of voltage constraints defining each power domain in the design;
   iteratively determining, for each power domain whether it is isolated by an isolation logic module exists in the design;
   verifying the correctness of the isolation logic module existing in the design, when the isolation logic module is identified;
   generating an isolation logic module for isolating the power domain, when the power domain is not correctly isolated;
   inserting the generated isolation logic module in the design; and
   outputting corrected files of the design that include at least the generated isolation logic modules.

2. The computer program product of claim 1, wherein the voltage constraints for each power domain comprise: a corresponding wakeup domain, a wakeup/shutdown signal, and a list of steady state values.

3. The computer program product of claim 2, wherein each of the steady state values defines a determinable under shutdown conditions.

4. The computer program product of claim 2, wherein the wakeup/shutdown signal is generated in the wakeup domain.

5. The computer program product of claim 1, wherein the isolation logic module and the design are in a register transfer level (RTL) description.

6. The computer program product of claim 1, wherein the voltage constraints are specified by a user by means of a graphical user interface (GUI).

7. The computer program product of claim 1, wherein verifying the correctness of the isolation logic module comprises:
   simulating shutdown conditions;
   comparing each of the output values of the power domain to a respective steady state value, and generating an error report when the comparison results in an inequality;
   checking when at least one isolation cell in the isolation module is not connected to the wakeup/shutdown signal, and generating the error report when the checking results an affirmative answer; and
   checking when the wakeup/shutdown signal is generated in the wakeup domain, and generating the error report when the checking results in a negative answer; otherwise, generating a success report.

8. The computer program product of claim 7, wherein the error report comprises at least one of an error type and a cause of the error.

9. The computer program product of claim 7, wherein the error report and the success report are displayed to the user.

10. The computer program product of claim 7, wherein the shutdown conditions and the output values of the power domain are highlighted in the design by means of a visualization tool.

11. The computer program product of claim 7, wherein the isolation cell comprises at least one of an AND gate, an OR gate, and a latch.

12. The computer program product of claim 1, wherein generating the isolation logic module comprises producing a description language code implementing the isolation logic module.

13. The computer program product of claim 12, wherein the description language comprises at least one of Verilog, VHDL, and a combination of Verilog and VHDL.

14. The computer program product of claim 13, wherein the description language code comprises instructions assuring that under shutdown conditions each of the output values is equal to a respective steady state value.

15. The computer program product of claim 12, wherein inserting the isolation logic module comprises:
   instantiating the description language code to form an instance of the isolation logic module;
   inserting the instance of the isolation logic module in the wakeup domain;
   renaming output names of the power domain; and
   assigning the original names of the power domain's output names to outputs of the isolation logic module.

16. The computer program product of claim 15, wherein the insertion of the isolation logic is performed using at least one of a back referencing analysis on a synthesized netlist.

17. The computer program product of claim 1, wherein inserting the isolation logic module is preceded by verifying the correctness of the isolation logic module placed in the design.

18. The computer program product of claim 1, wherein at least one of a computer aided design (CAD) system, a CAD program, a netlist voltage domain analysis tool, and a RTL voltage domain analysis tool is used to implement the method.

19. A method for generating isolation logic modules in a design of an integrated circuit (IC) on a computer aided design (CAD) system, the method comprising:
   specifying a plurality of voltage constraints defining each power domain in the design and stored in a database of the CAD system;
   iteratively producing, for each power domain using the voltage constraints, a description language code implementing the isolation logic module by a code generator;
   instantiating the description language code to form an instance of the isolation logic module by an insertion unit;
   inserting the instance of the isolation logic module in a wakeup domain using an insertion unit of the CAD system;
   renaming output names of the power domain;
   assigning the original names of output names of the power domain to outputs of the isolation logic module; and
   outputting a file of the design file by said insertion unit of the CAD system that includes at least the isolation logic module, the modified wakeup domains and the modified power domains.

20. The method of claim 19, wherein the voltage constraints are specified by a user and include for each power domain: a corresponding wakeup domain, a wakeup/shutdown signal, and a list of steady state values.

21. The method of claim 19, wherein the description language comprises at least one of Verilog, VHDL, or combination of Verilog and VHDL.

22. The method of claim 20, wherein the description language code comprises instructions assuring that under shut down conditions each of the output values is equal to a respective steady state value.

23. The method of claim 19, wherein the insertion of the isolation logic is performed using at least one of a back referencing analysis and a synthesized netlist.

24. The method of claim 19, wherein inserting the isolation logic module is preceded by verifying the correctness of the isolation logic module placed in the design.

25. The method of claim 19, wherein at least one of a computer aided design (CAD) system, a CAD program, a netlist voltage domain analysis tool, and a RTL voltage domain analysis tool is used to implement the method.

26. A computer program product, enabling a computer system to perform a computer implemented method for generating isolation logic modules in a design of an integrated circuit (IC), the computer program product having computer instructions on a tangible computer readable medium, the computer instructions being adapted to enable the computer system, when executing the computer instructions, to perform operations, comprising:
   specifying a plurality of voltage constraints defining each power domain in the design;
   iteratively producing, for each power domain using the voltage constraints, a description language code implementing the isolation logic module;
   instantiating the description language code to form an instance of the isolation logic module;
   inserting the instance of the isolation logic module in a wakeup domain;
   renaming output names of the power domain;
   assigning the original names of the power domain's output names to outputs of the isolation logic module; and
   outputting a file of the design that includes at least the isolation logic module, the modified wakeup domains and the modified power domains.

27. The computer program product of claim 26, wherein the voltage constrains are specified by a user and include for each power domain: a corresponding wakeup domain, a wakeup/shutdown signal, and a list of steady state values.

28. The computer program product of claim 26, wherein the description language comprises at least one of Verilog, VHDL, and a combination of Verilog and VHDL.

29. The computer program product of claim 27, wherein the description language code comprises instructions assuring that under shut down conditions each of the output values is equal to a respective steady state value.

30. The computer program product of claim 26, wherein the insertion of the isolation logic is performed using at least one of a back referencing analysis and a synthesized netlist.

31. The computer program product of claim 26, wherein inserting the isolation logic module is preceded by verifying the correctness of the isolation logic module placed in the design.

32. The computer program product of claim 26, wherein at least one of a computer aided design (CAD) system, a CAD program, a netlist voltage domain analysis tool, and a RTL voltage domain analysis tool is used to implement the method.

33. A method for verifying the correctness of isolation logic modules in a design of an integrated circuit (IC) on a computer aided design (CAD) system, the method comprising:
   specifying a plurality of voltage constraints defining each power domain in the design and stored in a database of the CAD system;

iteratively simulating shutdown conditions for each power domain by a simulator of the CAD system;

comparing each of the output values of the power domain to a respective steady state value, and generating an error report when the comparison results in an equality;

checking when at least one isolation cell in the isolation module is not connected to a wakeup/shutdown signal by a checking unit of the CAD system;

checking when the wakeup/shutdown signal is generated in a wakeup domain by said checking unit of the CAD system; and generating at least an error report by said checking unit of the CAD system that includes at least one of wakeup/shutdown signals generated in the wakeup domain and wakeup/shutdown signals not connected in the isolation module.

34. The method of claim 33, wherein the wakeup domain, the wakeup/shutdown signal, and the steady state values are part of the voltage constraints.

35. The method of claim 33, wherein the error report comprises at least one of an error type, and a cause of the error.

36. The method of claim 33, wherein the error report and the success report are displayed to the user.

37. The method of claim 33, wherein the shutdown conditions and the output values of the power domain are highlighted in the design by means of a visualization tool.

38. The method of claim 33, wherein the isolation cell comprises at least one of an AND gate, an OR gate, and a latch.

39. A computer program product, enabling a computer system to perform a computer implemented method for verifying the correctness of isolation logic modules in a design of an integrated circuit, the computer program product having computer instructions on a tangible computer readable medium, the computer instructions being adapted to enable the computer system, when executing the computer instructions, to perform operations, comprising:

specifying a plurality of voltage constraints defining each power domain in the design;

iteratively simulating shutdown conditions, for each power domain;

comparing each of the output values of the power domain to a respective steady state value, and generating an error report when the comparison results in an inequality;

checking when at least one isolation cell in the isolation module is not connected to a wakeup/shutdown signal;

checking when the wakeup/shutdown signal is generated in a wakeup domain; and generating at least an error report that includes at least one of wakeup/shutdown signals generated in the wakeup domain and wakeup/shutdown signals not connected in the isolation module.

40. The computer program product of claim 39, wherein the wakeup domain, the wakeup/shutdown signal, and the steady state values are part of the voltage constraints.

41. The computer program product of claim 39, wherein the error report comprises at least one of an error type and a cause of the error.

42. The computer program product of claim 39, wherein the error report and the success report are displayed to the user.

43. The computer program product of claim 39, wherein the shutdown conditions and the output values of the power domain are highlighted in the design by means of a visualization tool.

44. The computer program product of claim 39, wherein the isolation cell comprises at least one of an AND gate, an OR gate, and a latch.

* * * * *